United States Patent [19]
Zuercher et al.

[11] Patent Number: 6,021,373
[45] Date of Patent: Feb. 1, 2000

[54] BACK-UP PROXIMITY SENSOR FOR A VEHICLE

[75] Inventors: Joseph C. Zuercher, Brookfield; Russell P. Schuchmann, Milwaukee; Steven C. Schmalz, Greenfield, all of Wis.

[73] Assignee: Eaton Corporation, Cleveland, Ohio

[21] Appl. No.: 09/217,267

[22] Filed: Dec. 21, 1998

[51] Int. Cl.$^7$ ..................................................... B60Q 1/00
[52] U.S. Cl. .............................. 701/300; 701/301; 701/9; 324/336; 340/435; 180/271; 56/16.7
[58] Field of Search .................................... 701/300, 301, 701/9; 324/336; 340/435; 180/271; 56/16.7

[56] References Cited

U.S. PATENT DOCUMENTS

| | | | |
|---|---|---|---|
| 5,128,874 | 7/1992 | Bhanu et al. | 701/301 |
| 5,574,426 | 11/1996 | Shisgal et al. | 340/435 |
| 5,635,922 | 6/1997 | Cho et al. | 340/903 |
| 5,717,203 | 2/1998 | Yung | 250/221 |
| 5,906,648 | 5/1999 | Zoratti et al. | 701/50 |
| 5,926,126 | 7/1999 | Engelman | 342/70 |

OTHER PUBLICATIONS

Viggh, Herbert E.M. and Flynn, Anita M., "Infrared People Sensors for Mobile Robots", SPIE, vol. 1007, Mobile Robots III, (1988), pp. 391–398.

Graham, J.H., Ph.D., and Meagher, J.F., M.S., "A Sensory–Based Robotic Safety System", IEEE Proceedings, vol. 132, Pt.D. No. 4, (Jul. 1985), pp. 183–189.

Goodridge, S. G., Kay, M. G., and Luo, R. C., "Multilayered Fuzzy Behavior Fusion for Real–Time Reactive Control of Systems with Multiple Sensors", IEEE Transactions on Industrial Electronics, vol. 43, No. 3, (Jun. 1996), pp. 387–394.

Hussain, T. M., Baig, A. M., Saadawi, T. N., and Ahmed, S. A., "Infrared Pyroelectric Sensor For Detection of Vehicular Traffic Using Digital Signal Processing Techniques", IEEE Transactions on Vehicular Technology, vol. 44, No. 3, (Aug. 1995), pp. 683–689.

Duckworth, G.L., Frey, M.L., Remer, C.E., Ritter, S., Vidaver, G., "Comparative Study of Non–Intrusive Traffic Monitoring Sensors", SPIE, vol. 2344, Intelligent Vehicle Highway Systems, (1994).

*Primary Examiner*—William A. Cuchlinski, Jr.
*Assistant Examiner*—Olga Hernandez
*Attorney, Agent, or Firm*—Hoffmann & Baron, LLP

[57] ABSTRACT

A back-up proximity sensor for a vehicle is formed with an array of sensor pairs. Each sensor pair includes a lower passive infrared sensor (PIR) having a first field of view and an upper PIR having a second field of view. Each lower PIR and upper PIR is vertically mounted with respect to one another. The lower PIR and upper PIR of each sensor pair are angularly directed such that the respective fields of view intersect, thereby establishing a detection zone in a region behind a vehicle. The sensor pairs are arranged in a substantially adjacent, semicircular configuration to provide a continuous area of coverage behind a vehicle. A detection circuit receives output signals from each sensor pair and generates an output signal indicative of a warm body being detected by both the upper and lower sensors in a selected sensor pair, eliminating false alarms generated by warm bodies outside the region of the desired detection zone.

24 Claims, 9 Drawing Sheets

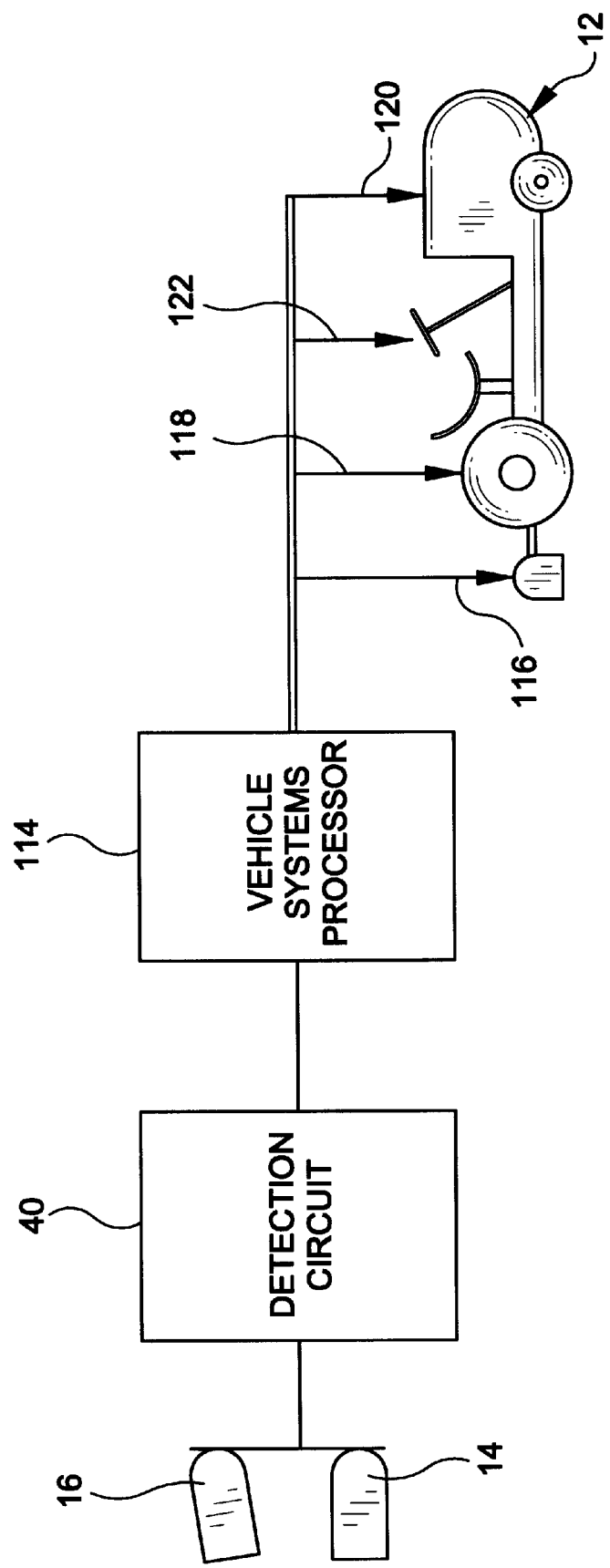

BACK-UP PROXIMITY SENSOR FOR A VEHICLE

BACKGROUND OF THE INVENTION

1. Field of the Invention

The present invention relates generally to proximity sensors and more particularly relates to proximity sensors adapted to sense warm bodies which are located behind a vehicle.

2. Description of the Prior Art

The problem of detecting warm bodies, such as people and animals, in an area behind a vehicle is well established. The problem is especially acute in the field of farm tractors and lawn mowing equipment. Presently, more than 5,000 injuries occur each year as a result of misuse of such equipment. A large percentage of these injuries are inflicted when a tractor is reversing and inadvertently strikes an unseen victim, resulting in impact injuries and lacerations from contact with a spinning mower blade.

Various forms of sensors have been employed in collision avoidance systems for vehicles. Among these systems are radio-based sensors (radar), ultrasonic sensors, laser-based radar and infrared sensors. Of these sensor technologies, passive infrared sensors (PIR) are particularly well suited for applications where it is desirable to discriminate warm bodies from inanimate objects. One type of PIR sensor, which is well known in the art, employs pyro-electric detectors to sense movement of a warm body in the sensors' field of view. Specifically, pyro-electric detectors detect differences between infrared energy emitted by the warm body or target and its background when triggered by the relative movement of at least one member of the set including the target, the pyro-electric detector, the PIR sensor or the vehicle on which the PIR sensor is mounted. Such detectors are commonly used in security systems to detect the presence of an intruder within a protected premise. Another type of PIR sensor utilizes thermocouple or thermopile technology, which senses mere presence of the warm body. PIR sensors have also been used in robotic systems to detect and track people in the vicinity of a mobile robotic system.

Vehicles, such as lawn tractors and the like, typically operate in an open outdoor environment which is subject to various sources of sensor interference. The typical environment may include irrigation sprinkler systems and fences made of conductive material which substantially interfere with the operation of radio-based proximity sensors. The environment may also include thermal "hot spots," such as areas where solar heating occurs on the ground, which interferes with the operation of conventional PIR sensors. Therefore, there remains a need for a back-up proximity sensor system for a vehicle which overcomes the problems associated with devices known in the prior art.

OBJECTS AND SUMMARY OF THE INVENTION

It is an object of the present invention to provide a back-up proximity sensor for a vehicle.

It is another object of the present invention to provide a back-up proximity sensor for a vehicle which can discriminate between warm bodies and inanimate objects located behind a vehicle.

It is yet another object of the present invention to provide a back-up proximity system for a vehicle which alters the vehicles operation when a warm body is detected behind the vehicle.

It is a further object of the present invention to provide a back-up proximity sensor which can detect a warm body in a 180° region behind a vehicle without mechanical rotation.

It is still a further object of the present invention to provide a back-up proximity sensor which employs an array of passive infrared sensors to detect warm bodies behind a vehicle.

It is yet a further object of the present invention to provide a back-up proximity sensor employing passive infrared sensors which is substantially immune from false sensing of thermal hot spots on the ground.

It is yet another object of the present invention to provide a back-up proximity sensor for a vehicle which provides the approximate angular position of a warm body located behind a vehicle.

In accordance with one form of the present invention, a back-up proximity sensor for a vehicle is formed having a sensor pair with a lower passive infrared (PIR) sensor and an upper passive infrared (PIR) sensor. The lower and upper PIR sensors are mounted vertically with respect to one another on a support member. The lower and upper PIR sensors each have an associated field of view and generate an output signal when a warm body is moving within the field of view. A detection circuit receives signals from the lower and upper PIR sensors and provides an output signal when both the lower and upper PIR sensors detect a warm body. The lower and upper sensors are angularly directed to one another such that the field of view of the lower and upper PIR sensors intersect, thereby forming a detection zone.

In a preferred form of the present invention, the lower PIR sensor is mounted below the upper PIR sensor. The lower PIR sensor is angularly directed such that its field of view is substantially parallel to the surface the vehicle is moving on. The upper PIR sensor is angularly directed downward, to effect the intersection of the fields of view. This establishes a detection zone behind the vehicle at a predetermined height above ground level such that hot spots on the ground are not detected.

In accordance with another form of the present invention, a back-up proximity sensor for a vehicle is formed with a plurality of sensor pairs. Each sensor pair has an associated angular field of view. The plurality of sensor pairs are aligned in a semicircular arrangement such that the detection zones of adjacent sensor pairs are substantially adjacent. The sensor pairs are preferably selected and arranged to provide protection in a 180° arc region behind the vehicle.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 8 is a block diagram illustrating the electrical interface between a back-up proximity sensor, formed in accordance with the present invention, and a vehicle, such as a lawn tractor.

DETAILED DESCRIPTION OF THE PREFERRED EMBODIMENTS

FIGS. 1–4 generally illustrate a back-up proximity sensor formed in accordance with the present invention. It is to be understood that references to the location or presence of a warm body in or within the detection zone, region or field of view are intended not only to include the mere presence of the warm body as indicated by thermocouple and thermopile technology, but also relative motion of the target, pyro-electric detector, PIR sensor or vehicle on which the PIR sensor is mounted as sensed by pyro-electric detectors. In addition, reference to the PIR sensor is intended to include those utilizing pyro-electric detectors as well as those utilizing thermocouple and thermopile technology.

Figure 1:
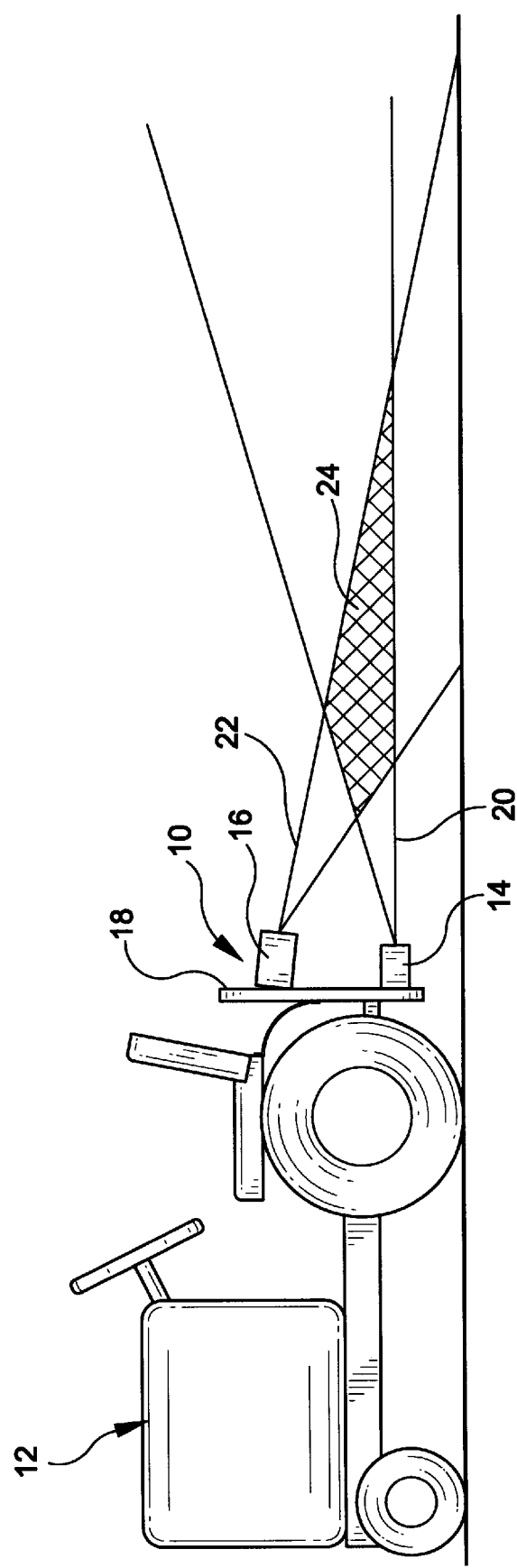
FIG. 1 is a pictorial view of a back-up proximity sensor formed in accordance with the present invention mounted on a vehicle, such as a tractor, illustrating a sensor pair formed with two passive infrared sensors creating a detection zone behind the vehicle.

Referring to FIG. 1, a back-up proximity sensor (BUPS) 10 is illustrated affixed to a rear portion of a vehicle 12. The BUPS 10 includes at least one sensor pair 11 including a lower passive infrared sensor (PIR) 14 and an upper PIR 16. The lower PIR 14 and upper PIR 16 are vertically mounted with respect to one another on a support member 18. The lower PIR 14 has an associated first field of view 20. The upper PIR 16 has an associated second field of view 22. Suitable PIR sensors are manufactured by Eltec Corporation of Daytona Beach, Fla., such as model number 5192, which, with an appropriate lens, features a uniform 30° field of view.

The lower PIR 14 and upper PIR 16 are angularly directed in a converging manner such that the first field of view 20 intersects the second field of view 22. The area of intersection of the first field of view 20 and the second field of view 22 defines a detection zone 24. The position and size of the detection zone 24 are determined by the vertical spacing between the lower PIR 14 and the upper PIR 16, as well as the angular direction of the lower PIR 14 with respect to the upper PIR 16.

An important consideration in vehicles such as tractors and lawn mowers is avoiding false detection of hot spots located on the ground which result from uneven solar warming. Such hot spots are created by sunlight filtering through partially shaded areas as well as areas of different coloration which absorb different amounts of solar heat. To avoid false indications of a warm body which result from the detection of such hot spots, it is preferred that the lower PIR 14 is directed horizontally ($\phi_2=0°$) such that the first field of view 20 is directed substantially in parallel with, and above, the surface on which the vehicle 12 is moving (ground). In this case, the upper PIR 16 is directed at an angle ($\phi_1$) below the horizon enabling the second field of view 22 to intersect the first field of view 20. This creates a detection zone 24 which does not contact ground level and is therefore "blind" to hot spots on the surface of the ground, as illustrated in FIG. 1.

In a preferred embodiment, the lower PIR 14 is mounted approximately eight (8) inches above the ground and the upper PIR 16 is mounted above the lower PIR 14 by a distance of approximately twelve (12) inches. The upper PIR 16 is directed at an angle ($\phi_1$) of approximately 16° below the horizon. This establishes a detection zone 24 located about 8 inches above ground level which begins approximately one foot behind the vehicle and extends a distance of approximately ten feet behind the vehicle. The lower PIR 14 and upper PIR 16 are preferably mounted on brackets 26 which include an adjustable pivot 28 to facilitate easy angular adjustment of the lower PIR 14 and upper PIR 16 to alter the size and location of the detection zone 24.

Figure 1A:
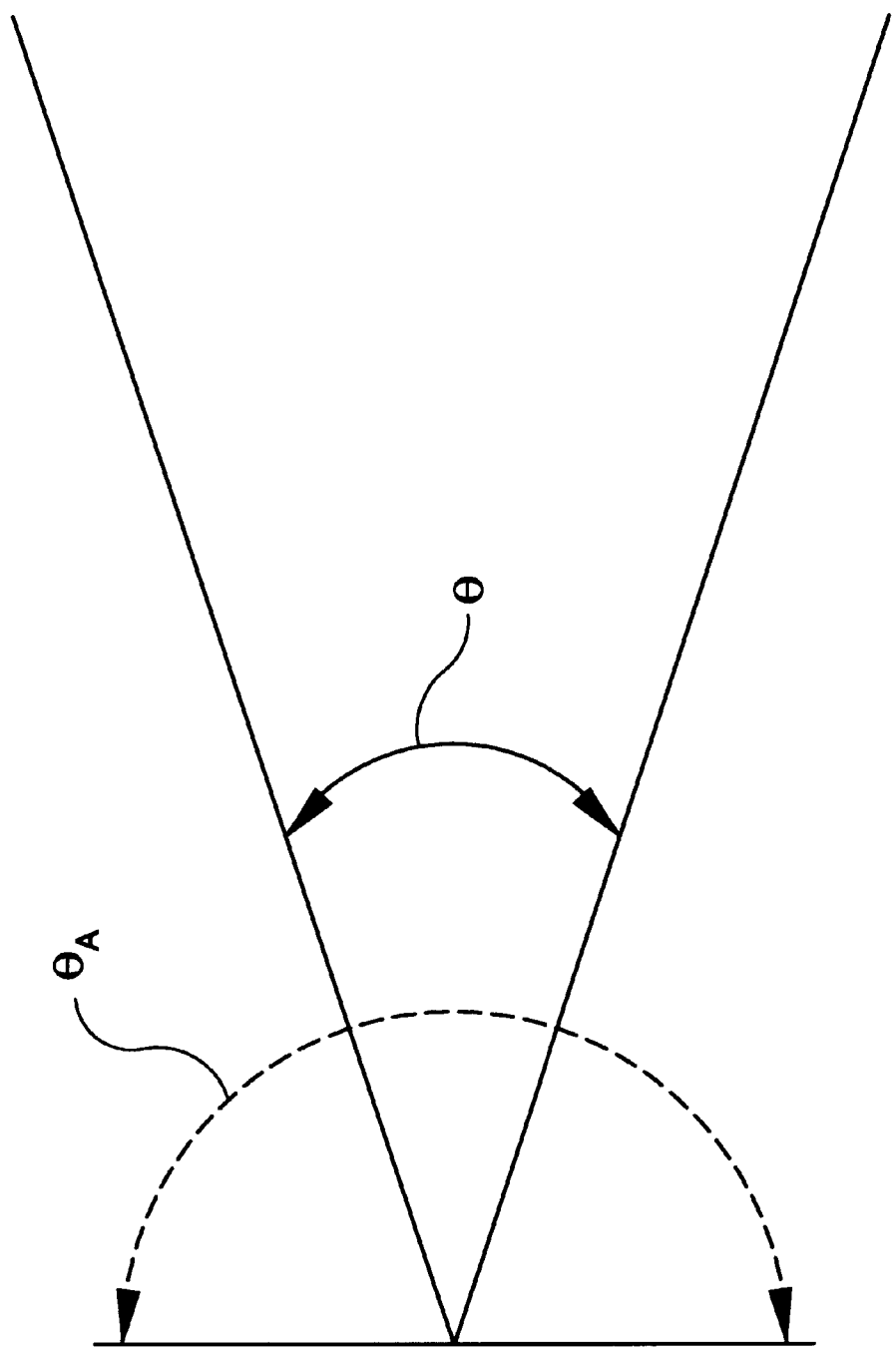
FIG. 1A is a top view illustrating the field of view of a typical passive infrared sensor used in a sensor pair, formed in accordance with the present invention.
Figure 2:
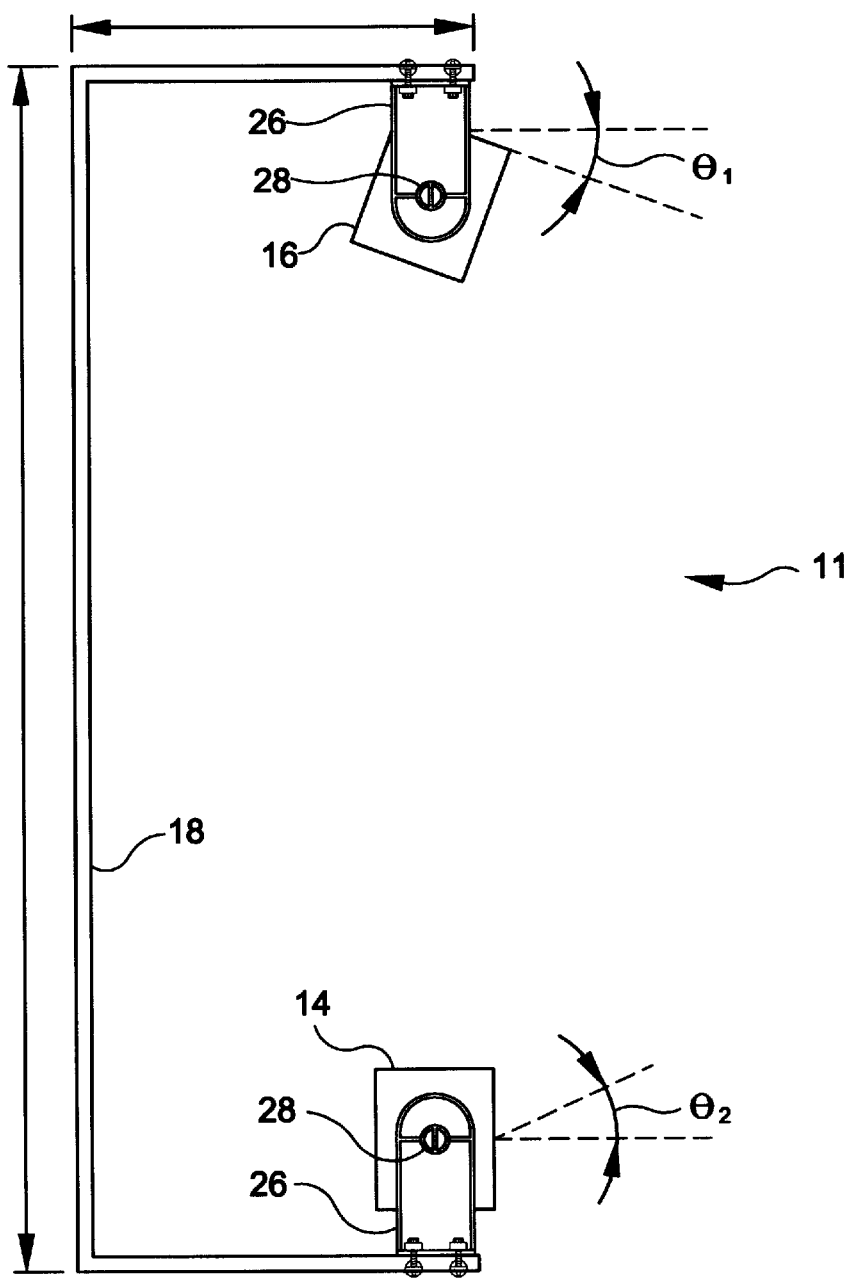
FIG. 2 is a side elevation view of a sensor pair for a back-up proximity sensor formed in accordance with the present invention.

Typically, pairs of passive infrared sensors (PIR), which maintain the size and location of the detection zone 24, have an angular field of view ($\Theta$, FIG. 1A) on the order of 40 degrees or less. However, in a vehicle BUPS 10, it is desirable to cover a region substantially encompassing an area of 180° behind the vehicle. Therefore, the present invention preferably employs multiple sensor pairs 11 arranged to provide substantially continuous coverage over the desired 180° area. This is referred to as a sensor cluster 30. An embodiment employing six sensor pairs 11 with a field of view of 30° each is illustrated in FIG. 3.

Figure 3:
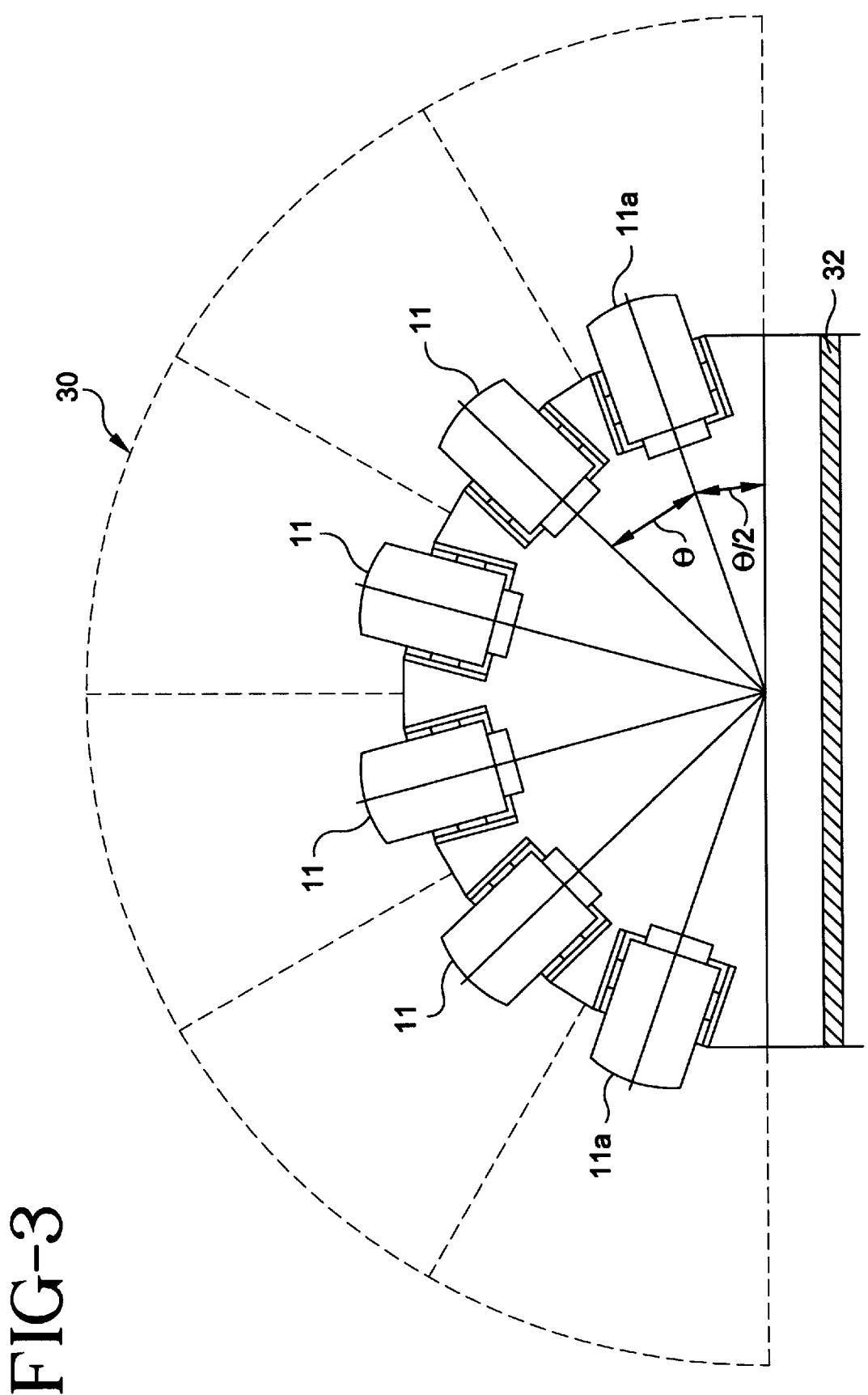
FIG. 3 is a top plan view of an array of sensor pairs forming a back-up proximity sensor in accordance with the present invention.

Referring to FIG. 3, the sensor pairs 11 are symmetrically spaced in a semicircular arrangement. The diameter of the semicircle is not critical so long as it accommodates the sensor pairs 11 in a substantially adjacent manner. The end sensor pairs 11a are directed away from a back surface 32 of the BUPS 10 by an angle substantially equal to one half of the sensor pair field of view ($\Theta/2$). The remaining sensor pairs 11 are then equally spaced with an angle $\Theta$ between adjacent sensor pairs 11. The number (n) of sensor pairs 11 used to form a sensor cluster 30 is dependent on the desired coverage area, $\Theta_A$, and the field of view, $\Theta$, of the sensor pairs 11. The equation, n=$\Theta_A/\Theta$, is used to determine the required number of sensor pairs 11. For example if $\Theta_A$ is 180°, and the sensor pairs have a field of view, $\Theta$, of 36°, then only five sensor pairs 11 are required (n=5). It should be understood that once the number of sensor pairs is fixed, the sensor cluster can be manufactured as a single housing (i.e., unibody construction) including the fixed number of sensors.

Each sensor pair 11 of the sensor cluster 30 includes a corresponding lower PIR 14 and upper PIR 16 which are responsive to warm body targets within their respective fields of view 20, 22. If a warm body is located within the detection zone 24 of a sensor pair 11, the lower PIR 14 will generate a first output signal and the upper PIR 16 will generate a second output signal. The back-up proximity sensor of the present invention includes a detection circuit 40 which receives and processes the first and second output signals from the lower PIR 14 and upper PIR 16 respectively, and generates a sensor output signal when a warm body is within the detection zone 24. While each sensor pair 11 can have an associated detection circuit 40, it is preferred to multiplex the signals from the plurality of sensor pairs 11 into a single detection circuit 40.

Figure 4:
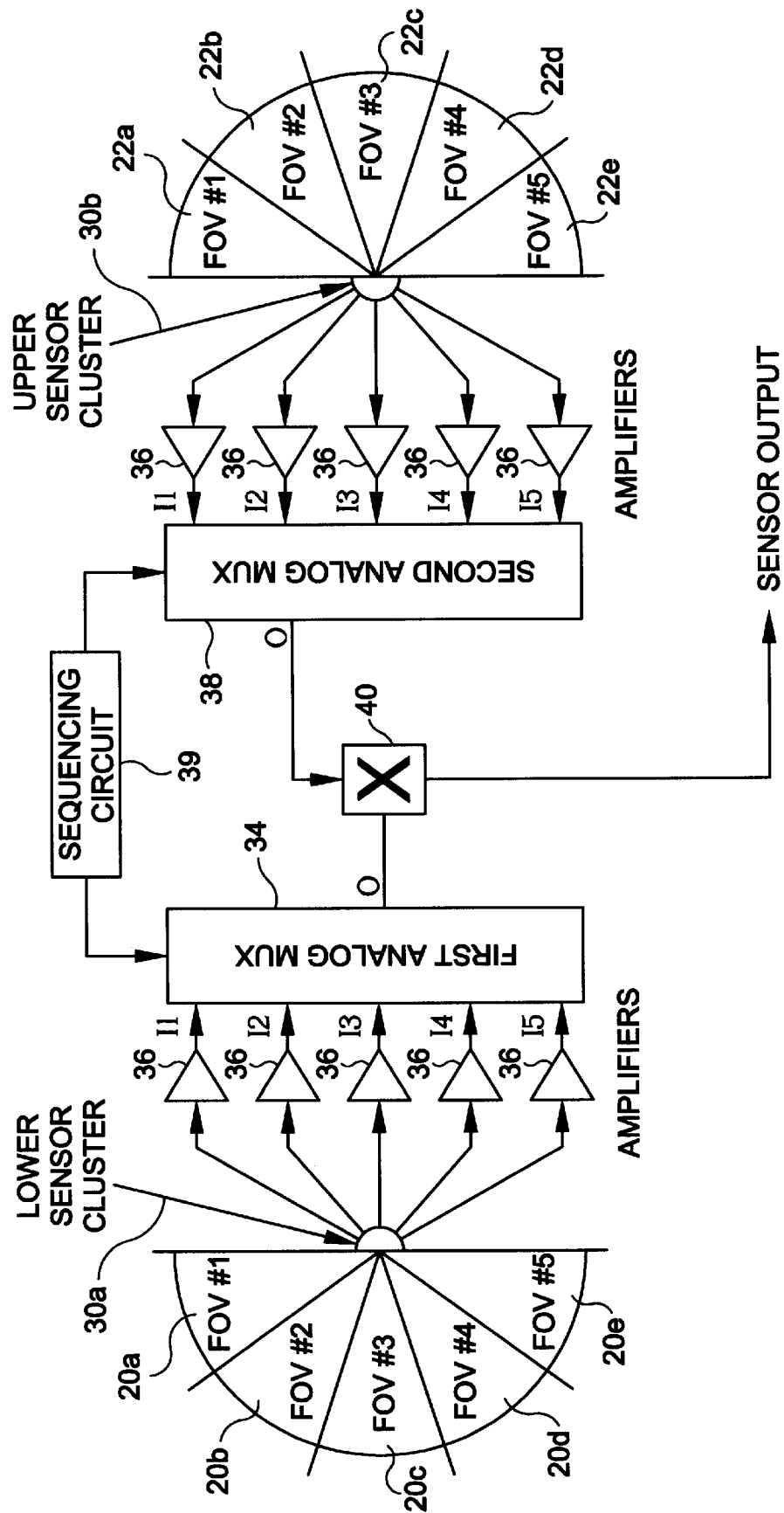
FIG. 4 is an electrical block diagram of a back-up proximity sensor formed in accordance with the present invention.

FIG. 4 is a block diagram illustrating a first circuit embodiment for receiving, multiplexing and correlating signals from the sensor cluster 30. Collectively, the lower PIR's 14 are referred to as a lower sensor cluster 30a. The lower sensor cluster 30a has a plurality of output signals corresponding to the output from each of the lower PIR's 14. The circuit of FIG. 4 includes a first analog multiplexer (MUX) circuit 34. The first analog MUX 34 receives the signals from the lower sensor cluster 30a and selectively routes one of these signals to an output terminal in response to a received address signal. Preferably, amplifier circuits 36 are interposed between each lower PIR 14 and the first analog MUX 34 to provide analog signal gain and isolation.

The upper PIR's 16 are collectively referred to as an upper sensor cluster 30b. The upper sensor cluster 30b has a plurality of output signals corresponding to the output from each upper PIR 16. A second analog multiplexer circuit (MUX) 38 receives the signals from the upper sensor cluster 30b and selectively routes one of these signals to an output terminal in response to a received address signal. Preferably, amplifier circuits 36 are interposed between the PIR outputs and the second analog MUX 38 to provide analog signal gain and isolation.

The output terminals of the first analog MUX 34 and second analog MUX 38 are connected to the detection circuit 40. A sequencing circuit 39 generates a common address signal for the first analog MUX 34 and second analog MUX 38. The common address signal has a number of discrete states which is equal to the number of sensor pairs 11 in the sensor cluster 30. The sequencing circuit may be formed in any manner known in the art of digital timing circuits. In a preferred embodiment, a CMOS counter integrated circuit, model number 4022, is used to generate the desired number of address states. By applying the common address signal to the first analog MUX 34 and the second analog MUX 38, the signals applied to the detection circuit 40 at any given time correspond to one of the sensor pairs 11.

It will be appreciated that since each sensor pair 11 is responsive to warm bodies in a specific angular region behind a vehicle, the common address signal also corresponds to an approximate sensor direction. By correlating the output signal from the detector circuit 40 with the state of the common address signal, the approximate direction of a detected warm body can be determined. For example, in FIG. 4, five sensor pairs form the sensor cluster 30 and cover five discrete regions, i.e., fields of view 20a–e, 22a–e (FOV#1–FOV#5). The sequencing circuit 39 has five discrete states to individually select each sensor pair 11 in the sensor cluster 36. If a sensor output signal is generated when the sequencing circuit 39 is in its first state, the warm body is within the region covered by FOV#20a, 22a. Similarly, states 2–5 of the sequencing circuit 39 correspond to FOV#2–5, respectively.

Figure 5:
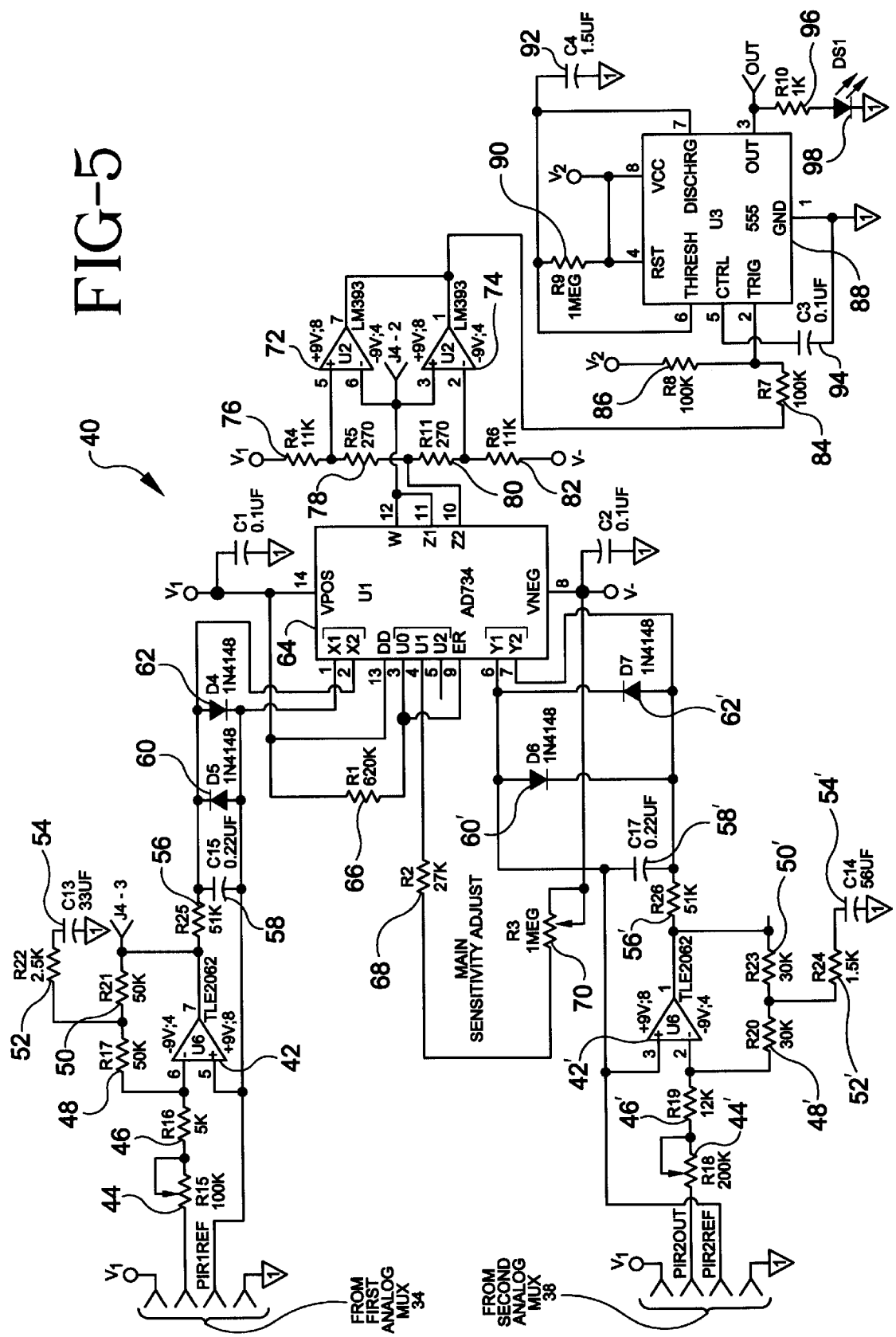
FIG. 5 is a schematic diagram of a detection circuit, formed in accordance with the present invention.

An exemplary detection circuit 40 is illustrated in the schematic diagram of FIG. 5. The output signals from each of the first analog MUX 34 and second analog MUX 38 are preferably amplified and filtered by the detection circuit 40. For example, the output signal from the first analog MUX 34 is preferably applied to an operational amplifier 42 through series resistors 44 and 46. Preferably, resistor 44 takes the form of a potentiometer to adjust the signal gain of operational amplifier 42 over a range from about 1–20. Resistors 48 and 50 are connected in series with each other and in feedback across the operational amplifier 42 to establish the gain of operational amplifier 42.

Preferably, a high pass filter is included which is formed at the junction of resistor 48 and resistor 50 by the inclusion of resistor 52 and capacitor 54. Resistor 52 and capacitor 54 are connected as a series circuit to circuit ground and are selected to form a high pass filter with a cut off frequency of about 10 Hertz. The output of operational amplifier 42 is coupled through a low pass filter section formed with series resistor 56 and shunt capacitor 58. Two back-to-back diodes, 60, 62 are coupled in parallel with capacitor 58 and clamp the output signal from operational amplifier 42 to ±0.7 volts. This signal is applied to a first input terminal of a correlation circuit 64.

The output signal from the second analog MUX 38 is preferably amplified, filtered and clamped in a similar manner to that just described and is applied to a second input terminal of the correlation circuit 64. Corresponding components have been designated with corresponding, but primed, reference designations in FIG. 5.

The correlation circuit 64 is responsive to the signals received on the first and second input terminals and generates an output signal when the input signals indicate that a warm body is present in the field of view of both the addressed lower PIR 14 and addressed upper PIR 16 of a selected sensor pair 11. Preferably, the correlation circuit 64 takes the form of a multiplication correlation function integrated circuit, such as Analog Devices model AD 734 four quadrant analog multiplier integrated circuit. In this embodiment, the correlation circuit 64 performs analog multiplication of the addressed lower PIR 14 output signal and upper PIR 16 output signal. The output signal is then proportional to the product of the two signals. Three resistors 66, 68 and 70 are included to establish the multiplication gain of the correlation circuit 64. Only when both the addressed lower PIR 14 and upper PIR 16 detect a warm body does the output signal reach a level indicative of a warm body within the addressed detection zone 24. Clamping the signals for opamps 42,42' to ±0.7 volts, as previously described, prevents a large received signal (i.e., from a very warm body) detected by only one of the PIR sensors from generating a false correlation output signal.

Preferably, the output signal of the correlation circuit 64 is applied to a comparator circuit including a first comparator circuit 72 and a second comparator circuit 74. Reference voltages for the first comparator circuit 72 and second comparator circuit 74 are generated by a resistor voltage divider network including four series connected resistors 76, 78, 80 and 82 which are coupled between a positive and a negative voltage source. Preferably, the first comparator circuit 72 and second comparator circuit 74 are open collector devices with their respective outputs tied together to a common pull-up resistor network 84, 86.

When the output signal from the correlation circuit 64 indicates that a warm body is within the detection zone 24, the outputs of the first comparator circuit 72 and second comparator circuit 74 are both set in a high impedance state which allows a voltage to be applied through resistor 86 to a one-shot pulse forming circuit 88.

The one-shot pulse forming circuit 88 receives an input signal from the first comparator circuit 72 and second comparator circuit 74 and generates a pulse of a predetermined pulse width and amplitude. A suitable one-shot circuit 88 can be formed in any manner known in the art, such as by using an 555 integrated circuit timer in combination with timing resistor 90 and capacitor 92 as illustrated. The output signal from the one-shot circuit 88, which is indicative of a target within the addressed detection zone 24, is presented on an output terminal of one-shot circuit 88. Capacitor 94 is coupled from the one-shot pulse forming integrated circuit to ground, thereby providing signal decoupling. Preferably, an optical display is operatively coupled to the output terminal to visually indicate the presence of a warm body behind the vehicle. Such a display can be formed with a series resistor 96 in combination with a light emitting diode 98 connected between the output terminal and a circuit ground potential.

Table 1, shown on the following page, illustrates values of the previously identified components used on illustrative embodiment of the present invention. With these components, $V_1$ is selected to be +9VDC, $V_2$ is selected to be +12VDC and V—is selected to be −9VDC.

TABLE 1

| Designations(s) | Type | Value |
|---|---|---|
| 42,42' | OP AMP | TLE2062 |
| 44 | POT | 100K |
| 46 | Res. | 5K |
| 48, 50 | Res. | 50K |
| 52 | Res. | 2.5K |
| 54 | Cap | 33 μf |
| 56, 56' | Res. | 51K |
| 58, 58' | Cap | 0.22 μf |
| 60, 62, 60', 62' | Diode | 1N4148 |
| 44' | POT | 200K |
| 46' | Res. | 12K |
| 48', 50' | Res. | 30K |
| 52' | Res. | 1.5K |
| 54' | Cap | 56 μf |
| 64 | QUAD Mult. | AD734 |
| 66 | Res. | 620K |
| 68 | Res. | 27K |
| 70 | POT | 1M |
| 72, 74 | Comparator | LM 393 |
| 76, 82 | Res. | 11K |
| 78, 80 | Res. | 270 |
| 84, 86 | Res. | 100K |
| 88 | Timer | NE555 |
| 90 | Res. | 1M |
| 92 | Cap | 1.5 μf |
| 94 | Cap | 0.1 μf |
| 96 | Res. | 1K |
| 98 | LED | Red |

Figure 6:
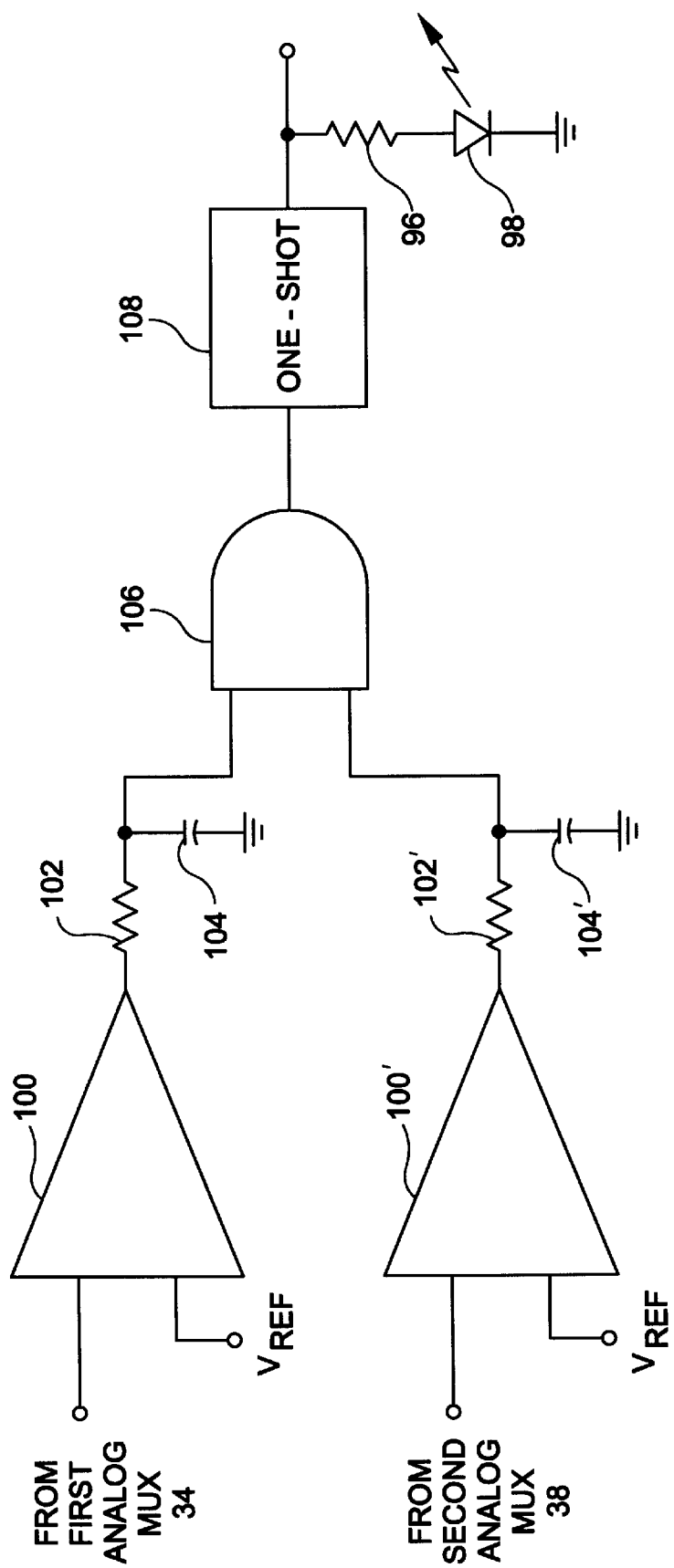
FIG. 6 is a schematic diagram of an alternate embodiment of a detection circuit, formed in accordance with the present invention.

FIG. 6 is a schematic diagram of an alternate embodiment of a detection circuit 40 formed in accordance with the present invention. Referring to FIG. 6, the output signal from the first analog MUX 34 is applied to a first comparator circuit 100. The first comparator circuit 100 compares the output signal from the first analog MUX 34 to a reference voltage and generates a two-state output signal indicative of presence or absence of a warm body in the field of view of the selected lower PIR 14. Preferably, the output signal from comparator circuit 100 is a logic level voltage, such as zero (0) and five (5) volts. A series resistor 102 and shunt capacitor 104 are preferably included and form a low pass filter to remove noise spikes from the output signal of comparator 100. The output signal from the second analog MUX 38 is processed in a similar manner, as shown in FIG. 5, where primed numbers indicate equivalent components to those previously described.

The filtered outputs of comparator circuits 100 and 100' are applied to an AND gate 106. The AND gate generates an output signal only when a positive logic signal is received from the outputs of comparators 100 and 100', indicative of a warm body being present in the field of view of both the lower PIR 14 and upper PIR 16 of the addressed sensor pair 11. The output of the AND gate 106 is preferably applied to the one-shot pulse forming circuit 88 which receives the output signal from the AND gate 106 and generates a pulse output of a predetermined width and amplitude. The output signal from the one-shot circuit 88 is applied to an output terminal. The one-shot circuit 88 can be formed in the same manner as previously described for one-shot circuit 88 (FIG. 5). Preferably, a display circuit including the resistor 96 and light emitting diode 98, as previously described, is coupled to the output terminal of the one-shot circuit 88.

Figure 7:
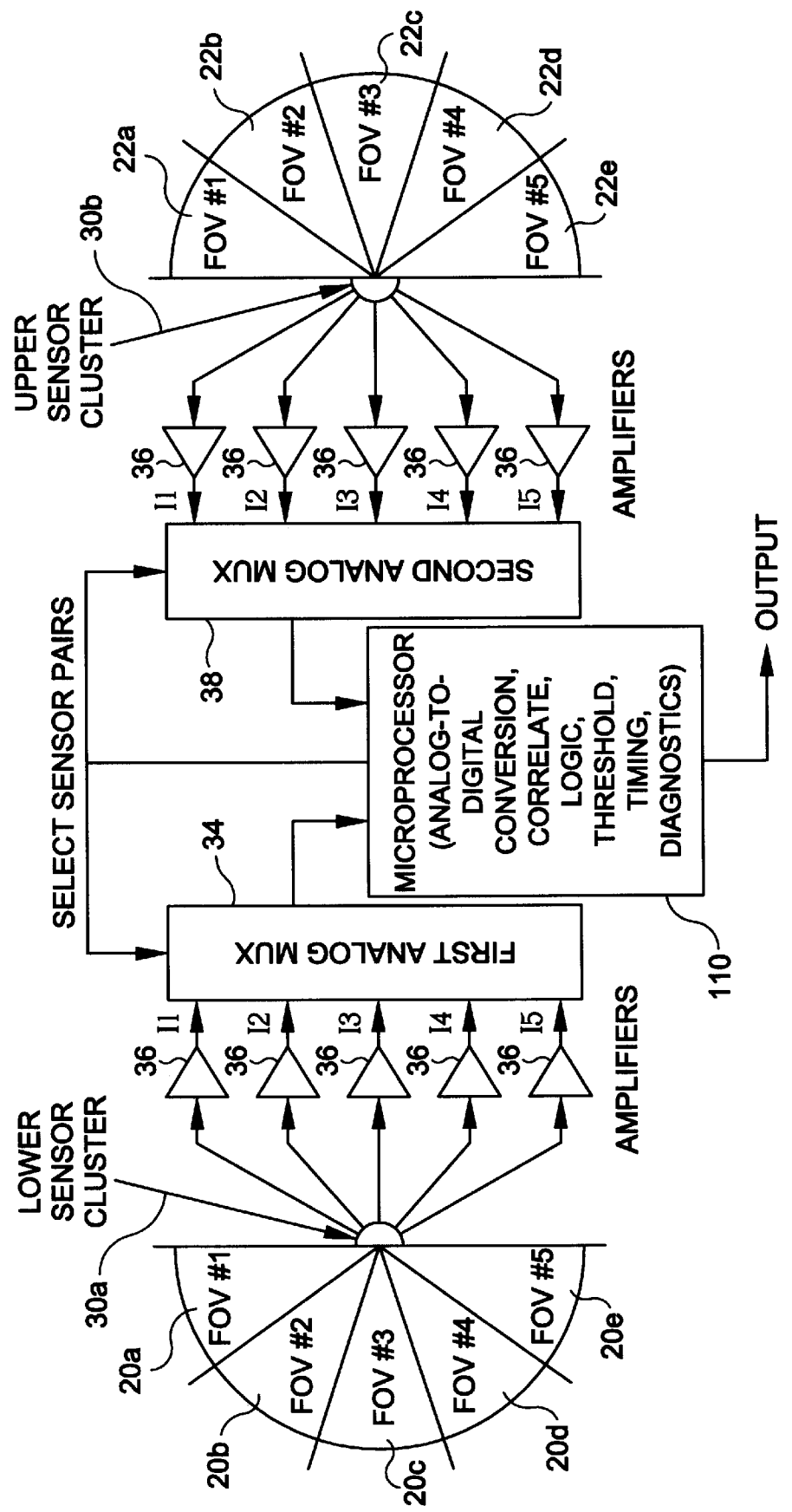
FIG. 7 is an electrical block diagram of an alternate embodiment of a back-up proximity sensor formed in accordance with the present invention.

FIG. 7 illustrates yet another embodiment of a detection circuit formed in accordance with the present invention. In this case, the signals from the first analog MUX 34 and second analog MUX 38 are applied to input terminals of a microprocessor 110. Preferably, the selected microprocessor 110 includes two suitable analog to digital convertor circuits. If not, external analog to digital convertors may be interposed between the multiplexers 34,38 and the microprocessor 110.

In FIG. 7, the microprocessor 110, running a suitable program, generates the select sensor pairs or common address signal for the first analog MUX 34 and second analog MUX 38, thereby eliminating the need for a separate sequencing circuit 39 (FIG. 4). The microprocessor 110 also compares the signals from the first analog MUX 34 and second analog MUX 38 and generates an output signal when a warm body is detected in the field of view of both the lower PIR 14 and upper PIR 16 of an addressed sensor pair 11. Digital filtering and signal processing algorithms can be employed with microprocessor 110 to further reduce false indications of warm bodies behind the vehicle. The microprocessor may also assess reasonableness of signals for diagnostic purposes. Preferably, the output signal from the microprocessor 110 is passed through a buffer amplifier 112 to protect the microprocessor 110. The output from the buffer amplifier 112 is applied to an output terminal and also, preferably, to a display circuit including a resistor 90 and light emitting diode 92, as previously described.

FIG. 8 is a block diagram illustrating a vehicle 12 interfaced to a back up proximity sensor 10 formed in accordance with the present invention. The detection circuit 40, regardless of the specific embodiment selected, generates an output signal which is indicative of the presence of a warm body within at least one sensor pair 11 detection zone 24. This output signal can directly drive a visual warning system, as previously described. In addition, the output signal from detection circuit 40 can be provided to a vehicle systems processor 114 which further interfaces to selected vehicle operations.

For example, the vehicle systems processor 114 can provide a signal to a lawn mower blade disable system 116 on a tractor, stopping the motion of the cutting blade when a warm body is detected. Similarly, the vehicle systems processor 114 can control an automated braking system 118 and/or an engine disable circuit 120 to prevent further motion of the vehicle 12 toward a detected warm body. In addition, an enhanced driver warning system 122 employing audio, visual and tactile indications, such as a vibration mechanism within the drivers seat or steering wheel of the vehicle, can also be activated by the vehicle systems processor 114. In this manner, a BUPS 10 of the present invention can alter the operation of a vehicle to avoid impacting a warm body behind the vehicle. Preferably, the vehicle systems processor 114 receives a signal indicative of the vehicle being placed in reverse and only alters vehicle operation when the vehicle 12 is moving, or about to move, backwards.

A back-up proximity sensor formed in accordance with the present invention provides enhanced protection of people and animals located behind a vehicle. The present invention provides a sensor which can discriminate between warm bodies and inanimate objects behind a vehicle to prevent false alarms. The present invention also provides a sensor which can eliminate the false detection of hot spots located on the ground. In addition, a sensor formed in accordance with the present invention provides 180° of coverage area behind a vehicle using PIR sensors with a narrow field of view and can provide the approximate angular direction of a detected warm body.

Although the preferred embodiment has been described with reference to PIR sensors, such as pyro-electric detectors, thermocouples and thermopiles, this is not intended as a limitation on the scope of the present invention. It is anticipated that alternative temperature, heat, infrared or other sensors, which detect warm bodies, could be used within the scope of the present invention. Such sensors include but are not limited to those employing thermocouples and thermopile technology. Greater detail regarding such sensors can be found in the following references, which are hereby incorporated by reference in their entirety:

R. A. Smith, F. E. Jones, and R. P. Chasmar, *The Detection and Measurement of Infrared Radiation*, Oxford University Press, London 1957.

Eustace L. Dereniak and Devon G. Crowe *Optical Radiation Detectors*, John Wiley and Sons, New York, N.Y. 1984.

W. L. Wolfe and G. J. Zissis (Editors) *The Infrared Handbook*, Environmental Research Institute of Michigan, Ann Arbor, Mich. 1985.

John David Vincent *Fundamentals of Infrared Detector Operating and Testing*, John Wiley and Sons, New York N.Y. 1989.

Herbert Kaplan *Practical Applications of Infrared Thermal Sensing and Imaging Equipment*, SPIE Optical Engineering Press, Bellingham, Wash. 1993.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the present invention.

What is claimed is:

1. A back-up proximity sensor for a vehicle, the sensor comprising:
   at least one sensor pair, each at least one sensor pair including:
      a first passive infrared sensor (PIR), the first PIR having a first field of view and generating a first output signal when a warn body is detected within the first field of view;
      a second passive infrared sensor (PIR), the second PIR having a second field of view and generating a second output signal when a warm body is detected within the second field of view, the first PIR and second PIR being arranged substantially vertically with respect to one another, the first PIR and second PIR being angularly directed such that the first field of view and second field of view intersect, the intersection defining a detection zone; and
   a detection circuit, the detection circuit being responsive to the first output signal and second output signal of each of the at least one sensor pair and providing a third output signal indicative of a warm body detected in at least one detection zone.

2. A back-up proximity sensor for a vehicle as defined by claim 1, wherein at least one of the first and second PIR sensors includes a pyro-electric detector.

3. A back-up proximity sensor for a vehicle as defined by claim 1, wherein at least one of the first and second PIR sensors includes a thermopile.

4. A back-up proximity sensor for a vehicle as defined by claim 1, wherein each at least one sensor pair is formed with:
   the first PIR mounted below the second PIR;
   the first PIR directed such that the first field of view is substantially parallel with a surface on which the vehicle is moving; and
   the second PIR directed at an angle towards the surface on which the vehicle is moving, such that the first field of view and second field of view intersect, whereby the detection zone is established above the surface on which the vehicle is moving.

5. A back-up proximity sensor for a vehicle as defined by claim 4, wherein each at least one sensor pair is formed with the first PIR mounted about eight inches above the surface on which the vehicle is moving.

6. A back-up proximity sensor for a vehicle as defined by claim 5, wherein each at least one sensor pair is formed with the second PIR mounted about 12 inches above the first PIR and the second PIR is angled downward at about 16 degrees.

7. A back-up proximity sensor for a vehicle as defined by claim 1, further comprising a driver warning system, the driver warning system being responsive to the third output signal of each at least one sensor pair and providing an indication to an operator of the vehicle that a warm body has been detected behind the vehicle.

8. A back-up proximity sensor for a vehicle as defined by claim 7, wherein the indication is at least one of a visual signal, an audible signal and a tactile signal.

9. A back-up proximity sensor for a vehicle as defined by claim 1, further comprising a vehicle interface processor, the vehicle interface processor being responsive to the third output signal of each at least one sensor pair and providing a control signal to alter the operation of the vehicle.

10. A back-up proximity sensor for a vehicle as defined by claim 9, wherein the vehicle further includes a lawn cutting attachment responsive to the control signal and the control signal disables the lawn cutting attachment when a warm body is detected behind the vehicle.

11. A back-up proximity sensor for a vehicle as defined by claim 9, wherein the vehicle includes an engine responsive to the control signal and the control signal disables the engine when a warm body is detected behind the vehicle.

12. A back-up proximity sensor for a vehicle as defined by claim 9, wherein the vehicle includes a braking system responsive to the control signal and the control signal engages the braking system when a warm body is detected behind the vehicle.

13. A back-up proximity sensor for a vehicle as defined by claim 1, wherein the at least one sensor pair is a plurality of sensor pairs, the plurality of sensor pairs being arranged in a substantially adjacent, semicircular configuration with the detection zones of adjacent sensor pairs being substantially adjacent, whereby substantially continuous coverage in a region behind a vehicle is achieved.

14. A back-up proximity sensor as defined by claim 13, further comprising:
   a sequencing circuit, the sequencing circuit generating an address signal having a plurality of signal states corresponding to the plurality of sensor pairs;
   a first signal multiplexer, the first signal multiplexer receiving each first output signal from the first PIR in each of the plurality of sensor pairs and selectively applying one first output signal to the detection circuit in response to the address signal; and
   a second signal multiplexer, the second signal multiplexer receiving each second output signal from the second PIR in each of the plurality of sensor pairs and selectively applying one second output signal to the detection circuit in response to the address signal, whereby the first and second output signals from each of the plurality of sensor pairs are selectively applied to the detection circuit.

15. A back-up proximity sensor as defined by claim 14, wherein the plurality of sensor pairs includes five sensor pairs within each sensor pair having a detection zone of approximately 36°.

16. A back-up proximity sensor as defined by claim 14, wherein the plurality of sensor pairs includes six sensor pairs within each sensor pair having a detection zone of approximately 30°.

17. A lawn tractor, including a lawn cutting attachment, in combination with a back-up proximity sensor, the back-up proximity sensor comprising:
- a first passive infrared sensor (PIR), the first PIR having a first field of view and generating a first output signal when a warm body is detected within the first field of view;
- a second passive infrared sensor (PIR), the second PIR having a second field of view and generating a second output signal when a warm body is detected within the second field of view, the first PIR and second PIR being arranged substantially vertically with respect to one another, the first PIR and second PIR being angularly directed such that the first field of view and second field of view intersect, the intersection defining a detection zone;
- a detection circuit, the detection circuit being responsive to the first output signal and second output signal and providing a third output signal indicative of a warm body being present within the detection zone; and
- a driver warning system, the driver warning system being responsive to the third output signal and providing an indication to an operator of the vehicle that a warm body has been detected behind the vehicle.

18. A lawn tractor as defined by claim 17, wherein at least one of the first and second PIR sensors includes a pyroelectric detector.

19. A lawn tractor as defined by claim 17, wherein at least one of the first and second PIR sensors includes a thermopile.

20. A lawn tractor as defined by claim 17, wherein the indication to the operator is a least one of a visual signal, an audible signal and a tactile signal.

21. A lawn tractor as defined by claim 17, further comprising a vehicle interface processor, the vehicle interface processor being responsive to the third output signal and providing a control signal to alter the operation of the tractor when a warm body is detected behind the tractor.

22. A lawn tractor as defined by claim 21, wherein the lawn cutting attachment is responsive to the control signal and the control signal disables the lawn cutting attachment when a warm body is detected behind the vehicle.

23. A lawn tractor as defined by claim 21, wherein the tractor includes an engine responsive to the control signal and the control signal disables the engine when a warm body is detected behind the vehicle.

24. A lawn tractor as defined by claim 21, wherein the tractor includes a braking system responsive to the control signal and the control signal engages the braking system when a warm body is detected behind the vehicle.

* * * * *